(12) United States Patent
Morrow et al.

(10) Patent No.: US 10,144,388 B2
(45) Date of Patent: Dec. 4, 2018

(54) DETECTION AND CLASSIFICATION OF RESTRAINT SYSTEM STATE

(71) Applicant: GM GLOBAL TECHNOLOGY OPERATIONS LLC, Detroit, MI (US)

(72) Inventors: Tricia E. Morrow, Grosse Pointe, MI (US); Senthil Karuppaswamy, Rochester Hills, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/581,500

(22) Filed: Apr. 28, 2017

(65) Prior Publication Data

US 2018/0312136 A1    Nov. 1, 2018

(51) Int. Cl.
*B60R 22/48*      (2006.01)
*B60R 22/00*      (2006.01)
*H04Q 9/00*       (2006.01)

(52) U.S. Cl.
CPC ............ *B60R 22/48* (2013.01); *B60R 22/001* (2013.01); *H04Q 9/00* (2013.01); *B60R 2022/485* (2013.01); *B60R 2022/4825* (2013.01)

(58) Field of Classification Search
CPC .......... B60R 22/48; B60R 22/001; H04Q 9/00
See application file for complete search history.

(56) References Cited

U.S. PATENT DOCUMENTS

| 4,885,566 | A | 12/1989 | Aoki et al. |
| 6,203,059 | B1 | 3/2001 | Mazur et al. |
| 2007/0195990 | A1 | 8/2007 | Levy |
| 2015/0251618 | A1* | 9/2015 | Ghannam ......... B60R 21/01544 340/457.1 |
| 2017/0113581 | A1* | 4/2017 | Mussi ................. B60N 2/4805 |
| 2017/0291576 | A1* | 10/2017 | Le .......................... B60R 22/48 |

FOREIGN PATENT DOCUMENTS

CN      201310512208 A    10/2013

* cited by examiner

*Primary Examiner* — Curtis Odom
(74) *Attorney, Agent, or Firm* — Lorenz & Kopf, LLP

(57) ABSTRACT

Systems and method are provided for controlling a vehicle. In one embodiment, a method for determining the state of a restraint system provided within a vehicle includes incorporating one or more marker components into a restraint system component located within the vehicle, then receiving sensor data associated with the position of one or more of the marker components. The method further includes determining, with a processor, a state of the restraint system based on the sensor data.

20 Claims, 6 Drawing Sheets

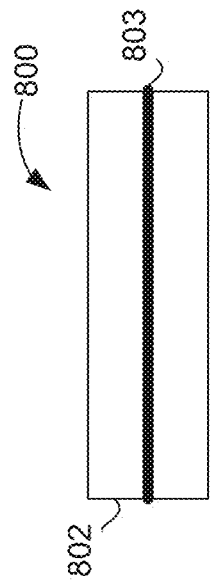
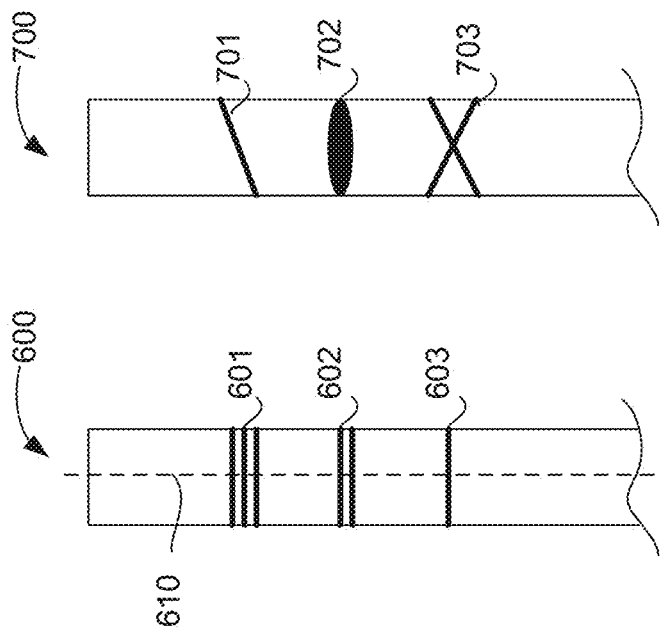
FIG. 8
FIG. 7
FIG. 6

DETECTION AND CLASSIFICATION OF RESTRAINT SYSTEM STATE

TECHNICAL FIELD

The present disclosure generally relates to vehicles, and more particularly relates to restraint systems such as airbags, safety belts and head restraints used in such vehicles.

BACKGROUND

Modern vehicles typically incorporate a wide range of restraint systems, such as belt restraints, head restraints, and the like. In conjunction with such restraint components, intelligent systems are often employed to determine whether individual seats are occupied, whether and to what extent occupants have pre-deployed their respective seat belts, the estimated weight/size of individual occupants, and other such information that can be used to characterize the effective state of the various restraint system components. While such systems are highly effective, it remains the case that, due to the number of components typically required to monitor the restraint system parameters (e.g., belt spool sensors, seat weight sensors, etc.), there remains a need to further reduce the complexity, weight, and size of such restraint systems and improving the ability for the system to making accurate classifications.

Accordingly, it is desirable to provide improved systems and methods that are capable of detecting and classifying the state of restraint systems used in vehicles and other moving platforms. Furthermore, other desirable features and characteristics of the present invention will become apparent from the subsequent detailed description and the appended claims, taken in conjunction with the accompanying drawings and the foregoing technical field and background.

SUMMARY

Systems and methods are provided for efficient detection and classification of restraint system pre-event state. In one embodiment, a method of determining the state of a restraint system provided within a vehicle includes incorporating one or more marker components into a restraint system component located within the vehicle, then receiving sensor data associated with the position of one or more of the marker components. The method further includes determining, with a processor, a state of the restraint system based on the sensor data.

In addition, in one example, the one or more restraint system components includes a belt restraint.

In addition, in one example, the one or more restraint system components includes a head restraint.

In addition, in one example, the sensor data is at least one of RF data, infrared data, and optical data.

In addition, in one example, the marker components include at least one of metallic fibers, metallic paint, and magnetic fibers.

In addition, in one example, the restraint system component comprises a woven material, and the marker component comprises metallic fibers incorporated into the woven material.

In addition, in one example, the state of the restraint system includes data indicative of the extent to which a belt restraint has been extended.

In addition, in one example, the method includes taking an action based on the state of the restraint system.

In addition, in one example, the method includes transmitting data relating to the state of the restraint system to a remote server.

In one embodiment, a restraint classification system for a vehicle includes a restraint system comprising a plurality of restraint system components and a plurality of marker components incorporated into one or more of the restraint system components. The system further includes a sensor configured to produce sensor data associated with the position of the one or more marker components, and a module, including a processor, configured to determine, with a processor, a state of the restraint system based on the sensor data.

In addition, in one example, the one or more restraint system components includes a belt restraint.

In addition, in one example, the one or more restraint system components includes a head restraint.

In addition, in one example, the sensor data is at least one of RF data, infrared data, and optical data.

In addition, in one example, the marker components include at least one of metallic fibers, metallic paint, and magnetic fibers.

In addition, in one example, the restraint system component comprises a woven material, and the marker component comprises metallic fibers incorporated into the woven material.

In one embodiment, a vehicle includes a restraint system with a plurality of restraint system components, wherein a plurality of marker components are incorporated into one or more of the restraint system components. A sensor is configured to produce sensor data associated with the position of the one or more marker components. A restraint system detection and classification module, including a processor, is configured to determine a state of the restraint system based on the sensor data.

In addition, in one example, the one or more restraint system components includes a belt restraint and a head restraint.

In addition, in one example, the sensor data is at least one of RF data, infrared data, and optical data.

In addition, in one example, the marker components include at least one of metallic fibers, metallic paint, and magnetic fibers.

In addition, in one example, the restraint system detection and classification module is configured to take an action based on the state of the restraint system.

DESCRIPTION OF THE DRAWINGS

The exemplary embodiments will hereinafter be described in conjunction with the following drawing figures, wherein like numerals denote like elements, and wherein:

FIGS. 6 and 7 illustrate exemplary restraint belt segments including embedded marker components in accordance with various embodiments; and FIG. 8 is a cross-section of an exemplary restraint belt segment in accordance with various embodiments.

DETAILED DESCRIPTION

Figure 1:
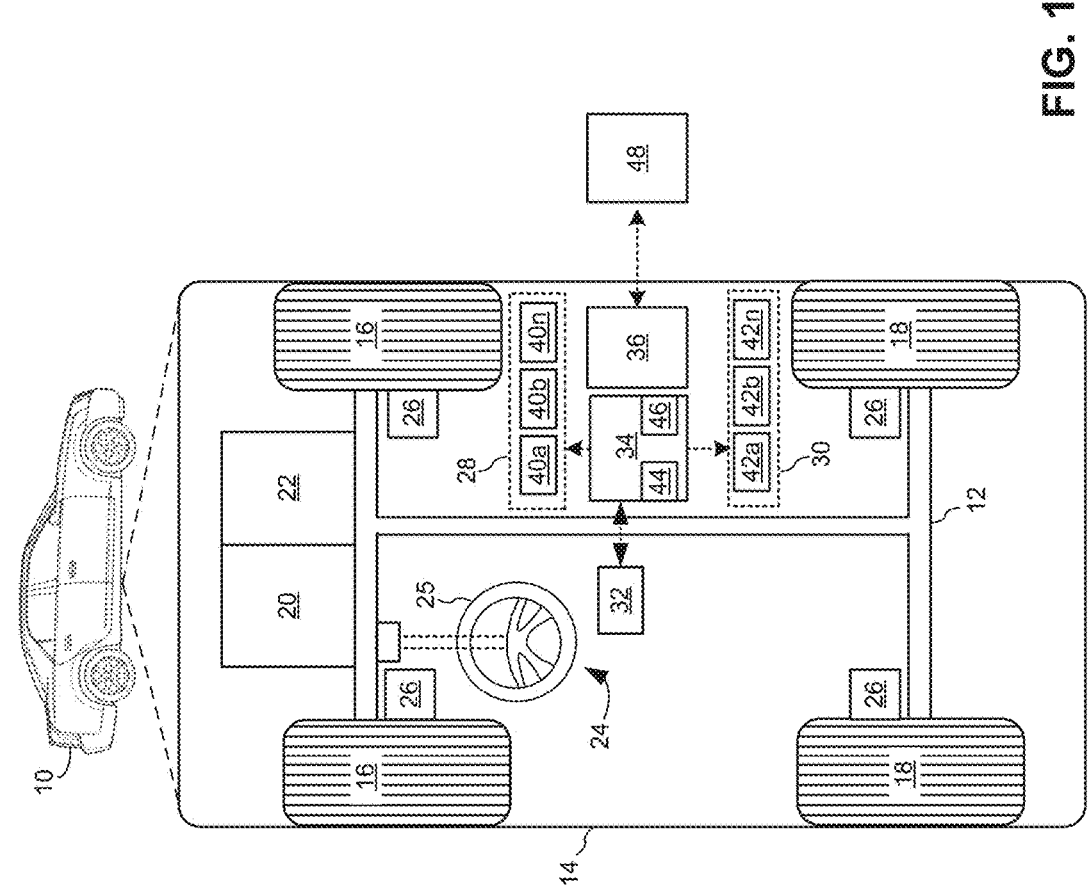
FIG. 1 is a functional block diagram illustrating an exemplary vehicle having a system for detecting the state of a restraint system in accordance with various embodiments.

Systems and methods are described for detecting and classifying the state of a restraint system used in conjunction with a vehicle. For example, marker components may be embedded in belt restraints, head restraints, and the like, which are then observed by a sensor that is configured to determine the nature and spatial location of those embedded marker components within the interior of the vehicle. These marker components might include, for example, metallic fibers placed within the belt restraint webbing at predefined locations such that their relative positions when deployed are indicative of the state of the restraint system—for example, presence and location of occupants, size of those occupants, locations of the head restraints, extent to which the belt restraints have been extended from the spool, and the like. A variety of sensors, such as RF sensors, may be used to characterize the embedded marker components.

The following detailed description is merely exemplary in nature and is not intended to limit the application and uses. Furthermore, there is no intention to be bound by any expressed or implied theory presented in the preceding technical field, background, brief summary, or the following detailed description. As used herein, the term "module" refers to any hardware, software, firmware, electronic control component, processing logic, and/or processor device, individually or in any combination, including without limitation: application specific integrated circuit (ASIC), a field-programmable gate-array (FPGA), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely one exemplary embodiments of the present disclosure.

For the sake of brevity, conventional techniques related to RF sensing, vehicle restraint systems, signal processing, data transmission, signaling, control, machine learning, image analysis, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

With reference to FIG. 1, a vehicle 10 employing a system in accordance with various embodiments generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14.

In various embodiments, vehicle 10 is characterized by some level of autonomy. For example, vehicle 10 may correspond to a level four or level five automation system under the Society of Automotive Engineers (SAE) "J3016" standard taxonomy of automated driving levels. Using this terminology, a level four system indicates "high automation," referring to a driving mode in which the automated driving system performs all aspects of the dynamic driving task, even if a human driver does not respond appropriately to a request to intervene. A level five system, on the other hand, indicates "full automation," referring to a driving mode in which the automated driving system performs all aspects of the dynamic driving task under all roadway and environmental conditions that can be managed by a human driver. It will be appreciated, however, the embodiments in accordance with the present subject matter are not limited to any particular taxonomy or rubric of automation categories. Furthermore, construction detection systems in accordance with the present embodiment may be used in conjunction with any vehicle that utilizes a navigation system to provide route guidance. Furthermore, vehicle 10 may be a traditional, non-vehicle.

While vehicle 10 is depicted in the illustrated embodiment as a passenger car, it should be appreciated that any type of vehicle, including motorcycles, trucks, sport utility vehicles (SUVs), recreational vehicles (RVs), marine vessels, aircraft, and other movable platforms employing a restraint system may also employ the various methods and systems described herein.

Referring again to FIG. 1, vehicle 10 generally includes a propulsion system 20, a transmission system 22, a steering system 24, a brake system 26, a sensor system 28, an actuator system 30, at least one data storage device 32, at least one controller 34, and a communication system 36 for communicating with an external system 48. The propulsion system 20 may, in various embodiments, include an internal combustion engine, an electric machine such as a traction motor, and/or a fuel cell propulsion system. The transmission system 22 is configured to transmit power from the propulsion system 20 to the vehicle wheels 16 and 18 according to selectable speed ratios. According to various embodiments, the transmission system 22 may include a step-ratio automatic transmission, a continuously-variable transmission, or other appropriate transmission.

The brake system 26 is configured to provide braking torque to the vehicle wheels 16 and 18. Brake system 26 may, in various embodiments, include friction brakes, brake by wire, a regenerative braking system such as an electric machine, and/or other appropriate braking systems.

The steering system 24 influences a position of the vehicle wheels 16 and/or 18. While depicted as including a steering wheel 25 for illustrative purposes, in some embodiments contemplated within the scope of the present disclosure, the steering system 24 may not include a steering wheel.

The sensor system 28 includes one or more sensing devices 40a-40n that sense observable conditions of the exterior environment and/or the interior environment of the vehicle 10. The sensing devices 40a-40n might include, but are not limited to, radars, lidars, global positioning systems, optical cameras, thermal cameras, ultrasonic sensors, and/or other sensors. In various embodiments, sensing devices 40a-40n include sensors capable of sensing marker components embedded in belt restraints, head restraints, or the like, such as RF sensors capable of sensing the position and configuration of embedded metal marker components.

Actuator system 30 includes one or more actuator devices 42a-42n that control one or more vehicle features such as, but not limited to, the propulsion system 20, the transmission system 22, the steering system 24, and the brake system 26. In various embodiments, vehicle 10 may also include interior and/or exterior vehicle features not illustrated in FIG. 1, such as various doors, a trunk, and cabin features such as air, music, lighting, touch-screen display components (such as those used in connection with navigation systems), and the like.

The data storage device 32 stores data for use in automatically controlling vehicle 10. In various embodiments, data storage device 32 stores defined maps of the navigable environment. In various embodiments, the defined maps may be predefined by and obtained from a remote system. For example, the defined maps may be assembled by the remote system and communicated to the vehicle 10 (wirelessly and/or in a wired manner) and stored in the data storage device 32. Route information may also be stored within data device 32—i.e., a set of road segments (associated geographically with one or more of the defined maps) that together define a route that the user may take to travel from a start location (e.g., the user's current location) to a target location. As will be appreciated, the data storage device 32 may be part of the controller 34, separate from the controller 34, or part of the controller 34 and part of a separate system.

The controller 34 includes at least one processor 44 and a computer-readable storage device or media 46. The processor 44 may be any custom-made or commercially available processor, a central processing unit (CPU), a graphics processing unit (GPU), an auxiliary processor among several processors associated with the controller 34, a semiconductor-based microprocessor (in the form of a microchip or chip set), any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the vehicle 10, and generate control signals that are transmitted to the actuator system 30 to automatically control the components of the vehicle 10 based on the logic, calculations, methods, and/or algorithms. Although only one controller 34 is shown in FIG. 1, embodiments of the vehicle 10 may include any number of controllers 34 that communicate over any suitable communication medium or a combination of communication mediums and that cooperate to process the sensor signals, perform logic, calculations, methods, and/or algorithms, and generate control signals to automatically control features of the vehicle 10. In one embodiment, as discussed in detail below, controller 34 is configured to detect and classify the state of a restraint system incorporated into vehicle 10.

Communication system 36 is configured to wirelessly communicate information to and from other entities 48, such as but not limited to, other vehicles ("V2V" communication), infrastructure ("V2I" communication), remote transportation systems, and/or user devices. In an exemplary embodiment, communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

As can be appreciated, the subject matter disclosed herein provides certain enhanced features and functionality to what may be considered as a standard or baseline vehicle 10. To this end, a vehicle and vehicle based remote transportation system can be modified, enhanced, or otherwise supplemented to provide the additional features described in more detail below.

As mentioned above, systems and methods are described for detecting and classifying the state of a restraint system by embedding marker components (e.g., metallic fibers, strips, etc.) into belt restraints, head restraints, and the like, which are then observed by a sensor (e.g., an RF sensor) configured to determine the nature and spatial location of those embedded marker components within the interior of the vehicle.

Figure 2:
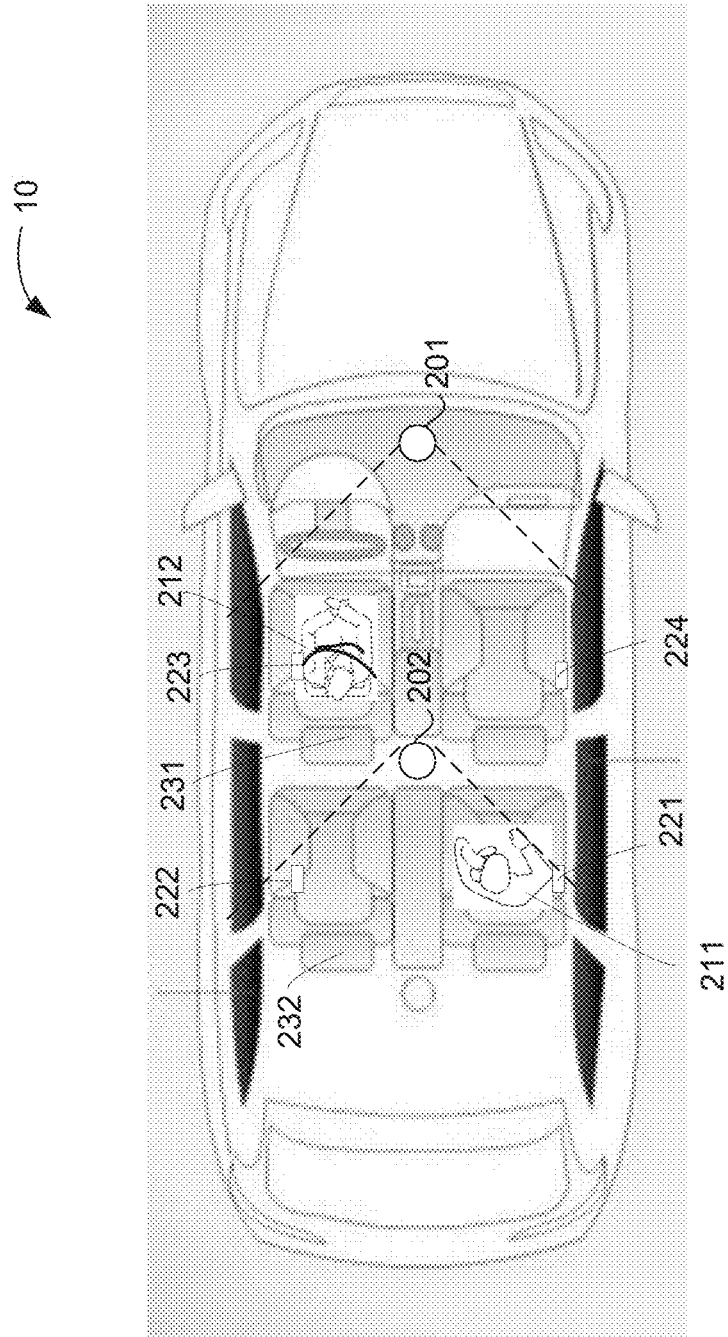
FIG. 2 illustrates the interior of a vehicle including a system in accordance with various embodiments.

In that regard, FIG. 2 illustrates the interior of vehicle 10, highlighting various restraint system features that might be incorporated therein. Two occupants are illustrated, an occupant 211 located in the back seat, and a second occupant 212 seated in the front driver's seat. Also illustrated are various belt restraint spools 221, 222, 223, and 224 from which corresponding belt restraints can be deployed by an occupant. Occupant 212, for example, is shown as wearing a belt restraint. The number and location of such belt restraints may vary depending upon the design of vehicle 10, as is known in the art.

In addition to belt restraint spools 221-224, vehicle 10 is also shown as including a number of head restraints, such as head restraints 231 and 232. In that regard, the phrase "restraint system" is used herein to encompass any of the various components used to restrain, to some extent, an occupant during operation of vehicle 10. While the present disclosure focuses primarily on head restraints and belt restraints, the invention is not so limited, and may also be used to sense the state of other interior vehicle components.

Also shown in FIG. 2 are a set of sensors 201 and 202 distributed throughout the interior of vehicle 10. These sensors each comprise suitable hardware and/or software capable of sensing the presence of various embedded marker components, as discussed in greater detail below.

Figure 3:
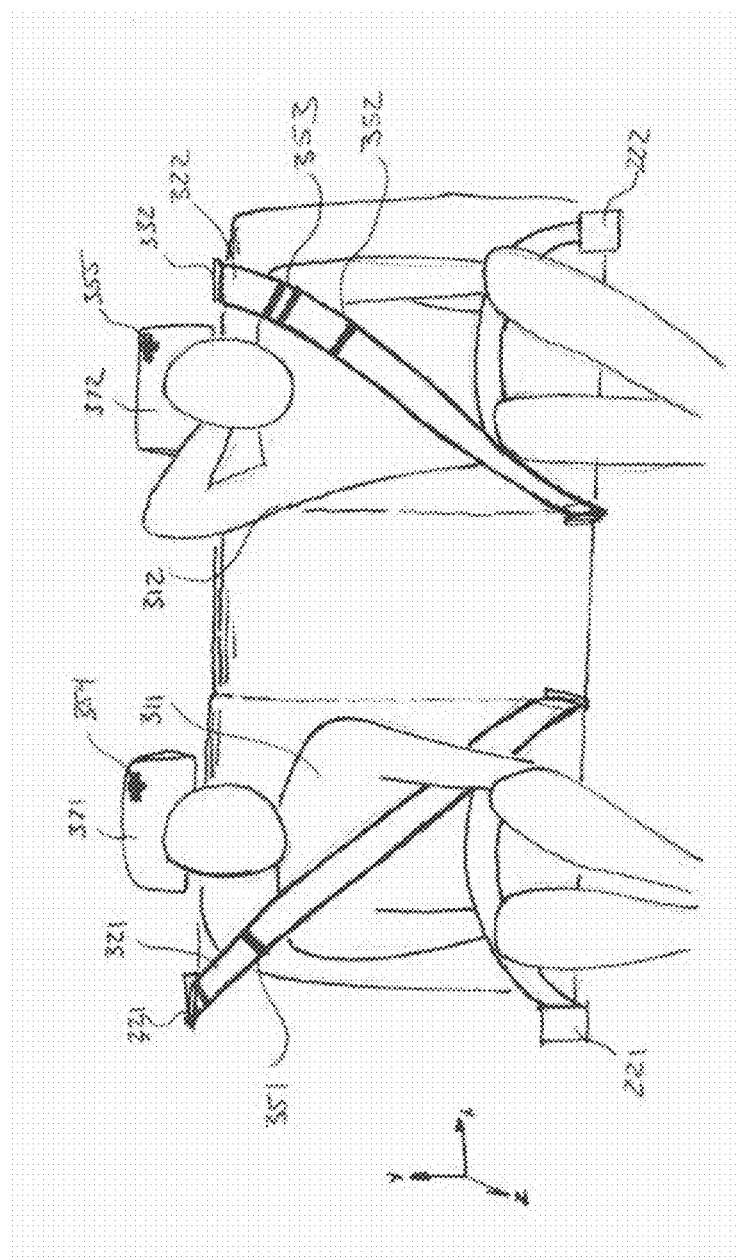
FIG. 3 illustrates occupants and restraints within the interior of a vehicle in accordance with an example embodiment.

FIG. 3 illustrates occupants and restraints within the interior of a vehicle in accordance with an example embodiment. Specifically, FIG. 3 depicts the rear passenger region of vehicle 10 with two occupants: occupants 311 and 312, both of whom have deployed their respective belt restraints 321 and 322. The belts have been have been extended for their respective belt spools, i.e., spools 331 and 221 for belt restraint 321, and spools 222 and 332 for belt restraint 322. For the sake of simplicity, additional components used in connection with belt restraints, such as tension reducers, pretensioners, load-limiters, buckles, tongue plates, and the like are not shown in the figure, but will be understood by a person skilled in the art.

Also shown in this figure are a set of marker components embedded in belt restraints 321 and 322. In this embodiment, belt restraint 321 has been extended such that it exposes one embedded marker component 351, and belt restraint 322 has been extended such that is exposes two marker components 352 and 353. In the illustrated embodiment, marker components 351, 352, and 353 are shown as "bar-shaped" markers, but the range of embodiments is not so limited, as described further below.

As mentioned previously, sensors 201 and 202 of FIG. 1 (the number and position of which might vary) are capable of sensing the physical location of marker components 351-353 using any suitable sensing scheme. In an embodiment in which marker components 351-353 are metallic components (such as embedded metallic fibers), sensors 201 and 202 may correspond to RF sensors. In the illustrated embodiment, an RF sensor (201 and/or 202) includes a signal generator and a reflected data sensor that is configured to identify the pattern of markers detected. This information is then sent to a processing unit that helps classify the corresponding detection state for the pattern recorded. Based on the sophistication of the sensor and processing unit and vehicle interior status data (pre-event) the detected marker data can also help determine the physical position of these markers within the sensed environment if so required. In other embodiments, sensors 201 and 202 are optical, IR, or other such sensors.

In the illustrated embodiment, consider the case in which the marker components are similarly configured for both belt restraints 321 and 322—that is, both include (over their entire lengths) the same number and types (e.g., shapes) of embedded marker components. In such a case, the system is able to conclude that, because two marker components (352 and 353) are visible for belt restraint 322, and only one marker component (351) is visible for belt restraint 321, belt restraint 322 has been expanded farther than belt restraint 321. By virtue of this difference, the system may infer that occupant 312 is larger (volumetrically) than occupant 311. This may also indicate that the weight or size of occupant 312 is greater than that of occupant 311. Furthermore, to the extent that the system can detect the precise location of marker components 351-353 in three-dimensional space, a more granular estimate of the size and weight of occupants 311 and 312 can be derived.

FIG. 3 also includes a pair of marker components 354 and 355 embedded within head restraints 371 and 372, respectively. Using the methods described above, the system may also determine the positions of head restraints 371 and 372 based on the known positions of marker components 354 and 355.

Figure 4:
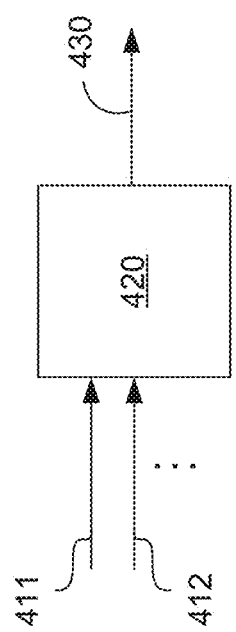
FIG. 4 is a dataflow diagram illustrating a system in accordance with various embodiments.

FIG. 4 is a dataflow diagram illustrating, generally, operation of a restraint system detection, processing and classification module (or simply "module") 420 that may be implemented by controller 34 of FIG. 1. In this regard, it will be understood that various embodiments of the system according to the present disclosure can include any number of sub-modules embedded within the controller 34. As can be appreciated, the sub-modules shown in FIG. 4 can be combined and/or further partitioned to operate similarly. Inputs to module 420 may be received from sensor system 28, received from other control modules (not shown) associated with the vehicle 10, received from the communication system 36, and/or determined/modeled by other sub-modules (not shown) within the controller 34 of FIG. 1.

With continued reference to FIG. 4, module 420 receives sensor input 411, 412, etc. from appropriate sensing systems, such as sensors 201 and 202 shown in FIG. 2. This sensor input might include data indicating the presence of particular shapes of marker components and/or the physical location (e.g., three-dimensional coordinates) of those components within the interior of vehicle 10. For example, input 411 may correspond to sensor information from sensor 201, while input 412 corresponds to sensor information from sensor 202.

Module 420 is configured to produce an output 430 that includes information regarding the state of the restraint system incorporated into vehicle 10. As used herein, the "restraint system state" includes data indicative of whether and to what extent various components of the restraint system (head restraints, belt restraints, etc.) have been deployed. Stated another way, the restraint system state might include a suitable data structure characterizing: how many occupants are present within the vehicle, where those occupants are located, whether belt restraints have been deployed for each of the occupants, the extent to which the belt restraints have been deployed (based on, for example, the location of the embedded marker components), location of head restraints, etc. Such information can be used by other systems of vehicle 10, e.g., for seat belt reminders, unlocking of infotainment features, when the pretentioners needs to be fired and the like. This information may also be shared with an external entity (such as 48 in FIG. 1).

Figure 5:
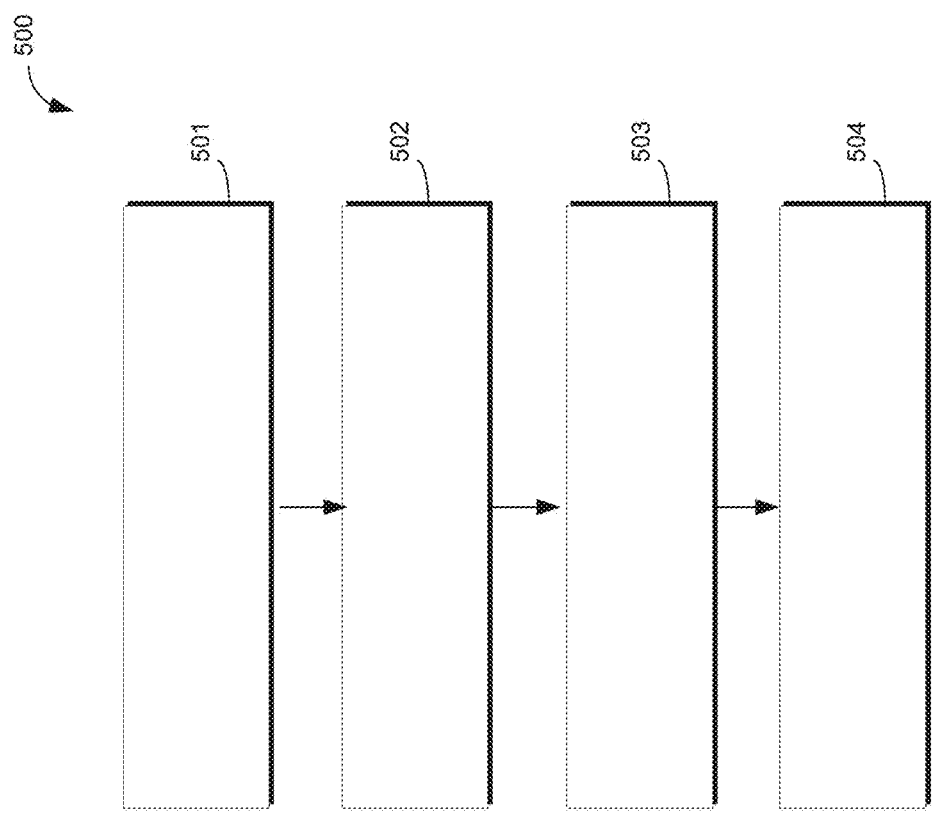
FIG. 5 is a flowchart illustrating a control method for controlling a vehicle in accordance with various embodiments.

FIG. 5 is a flowchart illustrating a control method for controlling a vehicle in accordance with various embodiments. Referring now to FIG. 5, and with continued reference to FIGS. 1-4, a flowchart illustrates a control method 500 that can be performed by the module 420 of FIG. 4. As can be appreciated in light of the disclosure, the order of operation within the method is not limited to the sequential execution as illustrated in FIG. 5, but may be performed in one or more varying orders as applicable and in accordance with the present disclosure. In various embodiments, the method 500 can be scheduled to run based on one or more predetermined events, and/or can run continuously during operation of the vehicle 10.

First, at 501, marker components are incorporated into (e.g., embedded into) various restraint components, such as belt restraints, head restraints, and the like. In connection with this step, module 420 is provided with sufficient code and/or data specifying the nature and location of the embedded marker components. This may be accomplished using any suitable data structure known in the art.

Next, at 502, sensor input 411 and 412 is acquired from sensors 101 and 102. As mentioned above, this input may include a wide range of information depending upon the nature of sensors 101, 102 as well as embedded marker components 351-353. Subsequently, at 503, the sensor input 411 and 412 is processed using a suitable model to produce an output 430 indicative of the state of the restraint system.

Next, at 503, controller takes an action based on the state of the restraint system and a type of an event, such as a pre-collision or collision event that has been detected. This may include, for example, the realignment or adjustment of airbags and/or pretensioners to provide optimal occupant protection for each of the occupants that have been detected and classified.

FIGS. 6 and 7 illustrate exemplary, non-limiting examples of restraint belt segments including embedded, applied, or painted-on marker components. In one embodiment, as shown in FIG. 6, belt restraint 600 includes (along its longitudinal axis 610) a series of marker components 601, 602, and 603, each including a successively larger number of similarly spaced horizontal bars. These marker components 601-603 are illustrated as equispaced along belt restraint 600, but might also be distributed at arbitrary but known distances (i.e., distances known by module 420).

In another embodiment, shown in FIG. 7, a belt restraint 700 includes a series of embedded marker components 701-703, each of which has a different shape as observed by sensors 201 and 202. As with the embodiment shown in FIG. 6, marker components 701-703 might be spaced at arbitrary but known distances, rather than equispaced along belt restraint 700.

FIG. 8 is a cross-section of an exemplary restraint belt segment in accordance with various embodiments. As mentioned above, the marker components may be "embedded" or otherwise incorporated into its respective head or belt restraint. FIG. 8 shows a simplified case in which the marker component 802 is fully embedded within a material 803 such that marker component 803 would generally not be visible to an individual observing belt restraint 800. In some embodiments, marker component 803 is "woven" into material 802. That is, marker component 803 may include a series of fibers or threads that can be incorporated into a similarly woven material 802.

In one embodiment, material 802 is a material typically used for such belt restraints in modern vehicles, such as a "webbing" of woven polyester. In some embodiments, marker component 802 is a metallic material, such as aluminum, steel, and/or an alloy. Marker component 802 may also be painted or printed using a metallic paint, metallic powder, or the like. In other embodiments, magnetic or non-visible markers may be employed.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method of determining the state of a restraint system provided within a vehicle, the method comprising:
   incorporating a plurality of marker components into a belt restraint of a restraint system located within the vehicle;
   receiving sensor data from a sensor disposed within the vehicle in a position in which the sensor can observe each of the plurality of marker components, wherein the sensor data comprises information as to respective spatial positions of the plurality of marker components and as to whether each of the plurality of marker components has been detected by the sensor;
   determining, with a processor, a state of the restraint system based on the sensor data, wherein the state of the constraint system comprises an extent to which the belt restraint is deployed for an occupant of the vehicle that is using the restraint system, based on the respective spatial positions of the plurality of marker components; and
   determining, with the processor, a size of the occupant of the vehicle that is using the restraint system, based on the respective spatial positions of the plurality of marker components and based on whether each of the respective plurality of marker components has been detected by the sensors.

2. The method of claim 1, wherein the state of the restraint system includes data indicative of the extent to which the belt restraint has been extended from its spool.

3. The method of claim 1, further including taking an action based on the state of the restraint system and the size of the occupant.

4. The method of claim 1, further comprising:
   determining, with the processor, a weight of the occupant of the vehicle that is using the restraint system, based on the respective spatial positions of the plurality of marker components and based on whether each of the respective plurality of marker components has been detected by the sensors.

5. The method of claim 1, wherein:
   the step of determining the state of the restraint system comprises, determining, with the processor, the state of the restraint system based on the sensor data, wherein the state of the constraint system comprises an extent to which the belt restraint is deployed for the occupant of the vehicle that is using the restraint system, based on respective three dimensional special positions of the plurality of marker components using the sensor data; and
   the step of determining the size of the occupant comprises determining, with the processor, the size of the occupant of the vehicle that is using the restraint system, based on the respective three-dimensional spatial positions of the plurality of marker components and based on whether each of the respective plurality of marker components has been detected by the sensors.

6. The method of claim 1, wherein:
   the plurality of marker components comprise a plurality of horizontal bars; and
   the step of determining the size of the occupant comprises determining the size of the occupant based upon how many of the horizontal bars have been detected by the sensors.

7. The method of claim 1, further comprising:
   determining relative sizes of multiple occupants in respective different seats of the vehicle, each seating having its own respective restraint system having a respective belt restraint, based on a difference in respective numbers of marker components that are detected by the sensors with respect to the different respective belt restraints.

8. The method of claim 3, wherein the step of taking the action comprises:
   providing a reminder for usage of the restraint system based on the state of the restraint system and the size of the occupant, as determined based on the respective spatial positions of the plurality of marker components and based on whether each of the respective plurality of marker components has been detected by the sensors.

9. The method of claim 8, wherein the providing of the reminder is based on a number of occupants that have respective belt restraints properly fastened.

10. The method of claim 3, wherein the step of taking the action comprises:
providing infotainment functionality based on the state of the restraint system and the size of the occupant, as determined based on the respective spatial positions of the plurality of marker components and based on whether each of the respective plurality of marker components has been detected by the sensors.

11. The method of claim 3, wherein the step of taking the action comprises:
adjusting usage of an airbag for the vehicle based on the state of the restraint system and the size of the occupant, as determined based on the respective spatial positions of the plurality of marker components and based on whether each of the respective plurality of marker components has been detected by the sensors.

12. The method of claim 3, wherein the step of taking the action comprises:
adjusting usage of one or more pretensioners of the restraint system based on the state of the restraint system and the size of the occupant, as determined based on the respective spatial positions of the plurality of marker components and based on whether each of the respective plurality of marker components has been detected by the sensors.

13. A restraint classification system for a vehicle, the restraint classification system comprising:
a restraint system comprising a plurality of restraint system components, including a belt restraint;
a plurality of marker components incorporated into the belt restraint;
a sensor configured to produce sensor data associated with the position of the one or more marker components, wherein the sensor is located within the vehicle in a position in which it can observe a plurality of the restraint system components, and wherein the sensor data includes information as to respective spatial positions of the plurality of marker components and as to whether each of the plurality of marker components has been detected by the sensor; and
a module, including a processor, configured to:
determine a state of the restraint system, along with a physical characteristic of an occupant using the restraint system, based on the position of the one or more marker components from the sensor data, wherein the state of the constraint system comprises an extent to which the belt restraint is deployed for an occupant of the vehicle that is using the restraint system, based on the respective spatial positions of the plurality of marker components; and
determine, with the processor, a size of the occupant of the vehicle that is using the restraint system, based on the respective spatial positions of the plurality of marker components and based on whether each of the respective plurality of marker components has been detected by the sensors.

14. The restraint classification system of claim 13, wherein the sensor data is at least one of RF data, infrared data, and optical data; and wherein the marker components each include at least one of metallic fibers, metallic paint, and magnetic fibers.

15. The restraint classification system of claim 13, wherein the restraint system component comprises a woven material, and each marker component comprises metallic fibers incorporated into the woven material.

16. The restraint classification system of claim 13, wherein:
the plurality of marker components comprise a plurality of sets of horizontal bars, with each set including a different respective number of horizontal bars, across the belt restraint;
and the module is configured to determine, via the processor, the size of the occupant based on the detection of the plurality of sets of horizontal bars by the sensors.

17. The restraint classification system of claim 13, wherein:
the plurality of marker components form a geometric pattern; and
the module is configured to determine, via the processor, the size of the occupant based on the detection of the geometric pattern by the sensors.

18. The restraint classification system of claim 13, wherein:
the plurality of marker components are made of metal; and
the sensors comprise RF sensors.

19. The restraint classification of claim 13, wherein the plurality of marker components are made of metallic paint.

20. A vehicle comprising:
a restraint system comprising a plurality of restraint system components including a belt restraint, wherein a plurality of marker components are incorporated into the belt restraint;
a sensor configured to produce sensor data associated with the position of the one or more marker components, wherein the sensor is located within the vehicle in a position in which it can observe a plurality of the restraint system components, and wherein the sensor data includes information as to respective spatial positions of the plurality of marker components and as to whether each of the plurality of marker components has been detected by the sensor; and
a restraint system detection and classification module, including a processor, configured to:
determine a state of the restraint system, along with a physical characteristic of an occupant using the restraint system, based on the position of the one or more marker components from the sensor data, wherein the state of the constraint system comprises an extent to which the belt restraint is deployed for an occupant of the vehicle that is using the restraint system, based on the respective spatial positions of the plurality of marker components; and
determine, with the processor, a size of the occupant of the vehicle that is using the restraint system, based on the respective spatial positions of the plurality of marker components and based on whether each of the respective plurality of marker components has been detected by the sensors.

* * * * *